United States Patent [19]
Walters et al.

[11] 3,842,534
[45] Oct. 22, 1974

[54] MUSHROOM TRAY

[76] Inventors: Armon J. Walters, 39 Haverhill Rd.; Peter A. Banis, 27 Preston Rd., both of Trumbull, Conn. 06611

[22] Filed: June 8, 1973

[21] Appl. No.: 368,354

[52] U.S. Cl.................. 47/1.1, 47/18, 220/97 R, 108/51, 108/53, 108/58
[51] Int. Cl............................................ A01g 1/04
[58] Field of Search.......... 220/97 R; 47/34.12, 1.1, 47/34, 17–18; 34/237–238; 108/51–58

[56] References Cited
UNITED STATES PATENTS

| | | | |
|---|---|---|---|
| 1,360,669 | 11/1920 | Nielsen | 47/18 |
| 1,876,571 | 9/1932 | Acuff | 47/18 |
| 2,524,246 | 10/1950 | Young | 47/18 |
| 2,849,151 | 8/1958 | Heil | 220/97 R |
| 3,024,569 | 3/1962 | Nearing et al. | 47/18 |
| 3,118,249 | 1/1964 | Bard et al. | 47/1.1 |
| 3,534,885 | 10/1970 | Theobald | 220/97 R |

*Primary Examiner*—Robert E. Bagwill
*Attorney, Agent, or Firm*—Thomas L. Tully; Arthur A. Johnson

[57] ABSTRACT

Stable trays adapted for the growth of mushrooms and being resistant to deterioration under the conditions of such use, comprising side walls, end walls, base members and legs formed of extruded aluminum and assembled in such manner as to provide stackable trays which are durable, corrosion-resistant, impervious to organic growth, light in weight, have low thermal expansion and high heat transfer and provide better air circulation than prior known trays for this purpose.

5 Claims, 8 Drawing Figures

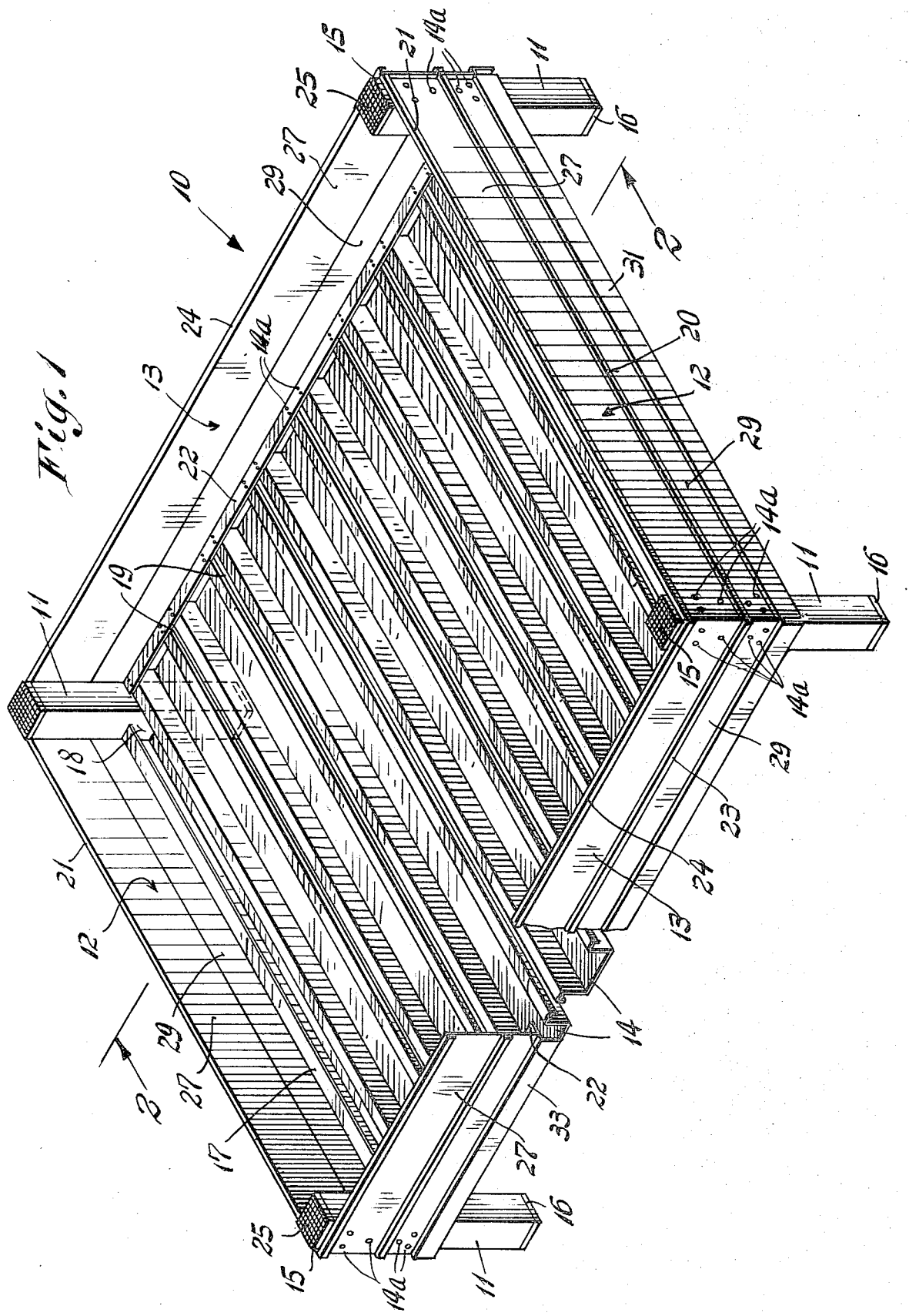

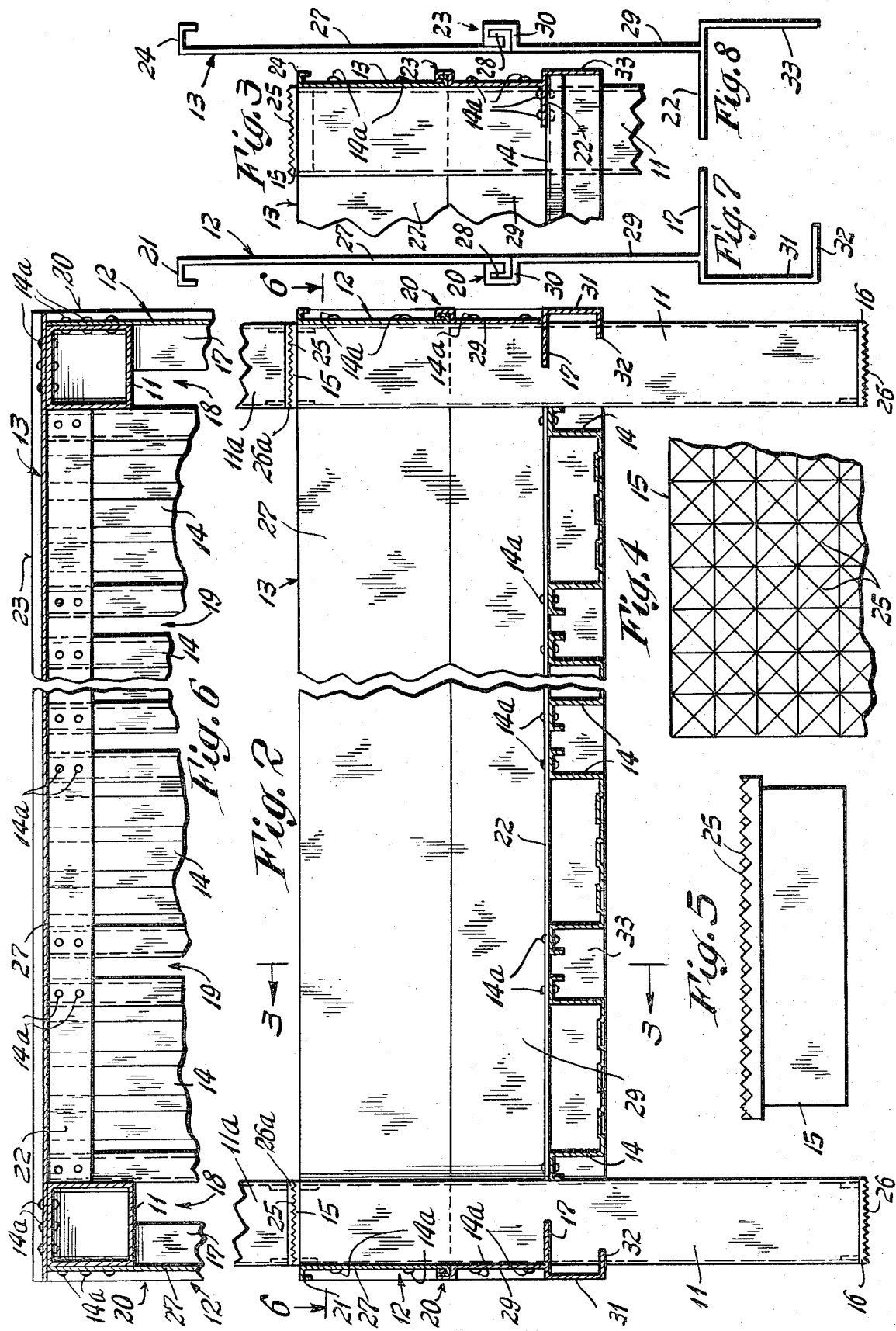

MUSHROOM TRAY

The growth of mushrooms takes place in several stages requiring different ambient conditions. In the first stage, the trays are filled with raw compost and then placed in a pasteurization room and held at an elevated temperature for approximately 13 days. In the second stage, the trays are dumped and then refilled with the pasteurized compost to which spawn has been added, and then placed in a room which has closely controlled humidity and temperature conditions for a period of approximately 13 days to permit development of the mycelium. In the third stage, the trays are covered or cased with a layer of soil and transported to a dark room which has closely controlled humidity conditions for a period of approximately 21 days for the growth of the mushrooms.

The mushrooms may be picked from the trays in the growing room which is dark and humid, or the trays may be moved out of the growing room, picked and then restacked in the growing room.

As can be readily understood, the growth of mushrooms at a large mushroom farm requires the use of thousands of trays in which the compost is pasteurized at high temperatures, the root system is germinated under controlled conditions and the mushrooms are grown under controlled humidity and temperature conditions. These trays must be stackable in close relationship, in order to accommodate the greatest possible number within the enclosed areas, and the trays must be strong enough to withstand the strain of being transported by fork-lifts and conveyor belts and/or rollers from the first area to the second.

The cost of constructing wooden mushroom trays has increased substantially in recent months and such wooden trays have a useful life of only about 3 years, on the average, so that their cost per year is fairly high. Wood deteriorates rapidly under the varying conditions of use so that wooden trays break under the strain of transportation or under the weight of stacking. Wood also expands to a substantial degree when moved from a dry atmosphere to a wet atmosphere and in some instances, where stacks of wooden trays are placed in touching relation, the expansion of the wooden trays is sufficient to topple the outermost stacks.

Wood is not impervious to organic growth and this contributes to the rotting of the wood during use for the growth of mushrooms. Wood has low heat transfer properties and thus wooden mushroom trays must be cooled substantially in order to prevent the high amount of heat, generated during germination, from killing the spores. Refrigeration is used to maintain the temperature during spawning well below 100°F since above this temperature that spores die. Higher amounts of refrigeration are required in cases where the mushroom trays restrict the circulation of the cool air and prevent the escape of the high heat built up during germination.

It has been proposed to form mushroom trays from galvanized steel, the tray bottom being a perforated fiber material such as Masonite. However such trays are heavier than wooden trays and the tray bottom is so flexible and weak that such trays cannot be moved by fork-lift devices or transported over rollers without damage to the trays or disruption of the contents caused by shifting of the compost. Furthermore, the tray bottom, while perforated at spaced intervals, has low heat transfer properties and greatly restricts the exposure of the base of the compost, adjacent the tray bottom, to the environmental conditions which assist germination of the root system and growth of the mushrooms.

With these problems and disadvantages in mind, it is the principal object of the present invention to provide novel mushroom trays which overcome the failings of prior known mushroom trays.

It is another object of this invention to provide novel mushroom trays which are resistant to deterioration and to organic growth and which have thermal properties which are particularly suited for mushroom growth, i.e., high heat conduction and low heat expansion under conditions of use.

It is still another object of this invention to provide novel mushroom trays which have a base structure which provides improved exposure of the contents to ambient conditions and which also is sufficiently strong and resistant to flexing to permit transportation of the trays by means of fork-lift devices and roller conveyors.

It is an advantage of this invention that the present novel mushroom trays are sturdy, light in weight, durable and have a cost per year which is lower than that of wooden trays.

These and other objects and advantages of the invention will be apparent to those skilled in the art in the light of the present disclosure including the drawings in which:

FIG. 1 is a perspective view of a mushroom tray according to one embodiment of the present invention, an end panel being partially cut away for purposes of illustration, FIG. 2 is a segmented cross-section taken along the line 2—2 of FIG. 1, FIG. 3 is a cross-section taken along the line 3—3 of FIG. 2, FIG. 4 is a double scale sectional plan view of the top leg inserts as used on the tray of FIG. 1, FIG. 5 is a side view, to scale, of the top leg inserts as used on the tray of FIG. 1, FIG. 6 is a segmented cross-section taken along the line 6—6 of FIG. 2, FIG. 7 is an end view, to one-half scale, of a side rail as used on the tray of FIG. 1, and FIG. 8 is an end view, to one-half scale, of an end rail as used on the tray of FIG. 1.

Referring to the embodiment of FIG. 1 of the drawings, the present rectangular mushroom trays 10 are faricated substantially completely from extruded aluminum or aluminum alloy and comprise supporting legs 11, side or panels 12 and end or panels 13 mated with and fixed to legs 11, spaced bottom cross members 14 supported by and fixed to end or panels 13, top leg inserts 15 and bottom leg inserts 16.

Side panels 12 are provided with flanges 17 which function as bracing means for the legs 11 and as partial bottom supports for the compost composition adjacent the sides of the tray. Between the flanges 17 and the adjacent bottom cross member 14 is an opening 18 similar to openings 19 which space each member 14 from the next. Side panels 12 are also provided with central lock members 20 and top collars 21 which assist to rigidify the panels against flexing.

End panels 13 are provided with flanges 22 which function as bracing means for the legs 11 but, more importantly, function as supports for the bottom cross members 14, each of which is fixed at each end to flanges 22. End panels 13 are also provided with central lock members 23 and top collars 24 which assist to rigidify the panels 13 against flexing under the load of the contents and/or under the stress of transportation.

The leg inserts 15 and 16 are provided with slip-resistant nesting means 25 and 26 respectively, the nesting means 25 of the legs 11 of one tray being adapted to nest with the mating nesting means 26a of leg 11a of another tray stacked thereon, as shown in FIG. 2, to provide straight, slip-resistant stacking of the trays. FIGS. 4 and 5 more clearly illustrate the structure of inserts 15 and the pyramidal nesting means 25 on the surface thereof.

As disclosed supra, substantially all of the elements of the present trays are produced from extruded aluminum or aluminum alloy, the elements being fastened together preferably by removable means, such as conventional pop rivets 14a shown in FIGS. 1, 2, 3 and 6, to permit the simple replacement of worn or damaged components.

The present trays may be produced in different sizes. A conventional size is one in which the side panels are 5 feet long, the end panels are 6 feet long, the legs are 20 inches high and the side and end panels are 7 to 8 inches high. Reference is made to FIG. 7 of the drawings which illustrates the single piece side panel 12 having base flange 17, central lock member 20 and top collar 21. Another conventional size is similar to the first but has legs which are 2 feet high and has side and end panels which are 10 to 11 inches high to provide a deeper tray. While unitary, one-piece side panels and end panels may be used, it has been found preferable in many cases to employ side panels and end panels which are extruded in two pieces which lock together, as shown in FIGS. 2 and 3, to provide panels of greater strength and flex resistance. Such panels 12 and 13 are more clearly illustrated by FIGS. 7 and 8 of the drawings and comprise top panel sections 27 having collars 21 and 24 respectively and tongue bars 28, and bottom panel sections 29 having flanges 17 and 22 respectively and groove bars 30, the tongue bars 28 and groove bars 30 nesting together to form the supporting lock members 20 and 23 respectively which brace the panels against flexing.

The side panels 12 are also provided with a lower beam 31 having a second flange 32 which extends between the legs 11 on each side of the tray, in the same manner as flanges 17, to provide additional strength and rigidity to the tray. The end panels 13 are provided with a lower beam 33 which projects downwardly from flange 22 and functions as an end closure for the bottom cross members 14.

The width and spacing of the bottom cross members 14 may be varied but generally such members are from 5 to 6 inches wide and are spaced by openings 19 which are from ½ to 1 inch wide. The cross members 14 preferably have the rectangular cross-sectional shape illustrated in FIG. 2 of the drawings but other angular shape such as trapezoidal, ridged or corrugated shapes may also be used, the essential requirement being the necessity that the base is discontinuous and yet resistant to such flexing and bowing as to cause the shifting of the contents of the tray when the tray is lifted by a fork-lift device and/or is transported over conveyor rollers.

The length of the legs of the present trays is sufficient to provide an opening of from about 8 to 15 inches between the base members 14 and one tray and the top edge of the side and end rails of the tray stacked thereunderneath so that the contents of each tray can be inspected and harvested while the trays are in stacked relationship. The side rails 12 and end rails 13 preferably are attached to the legs adjacent the top of each, as shown in the drawings. However, if desired, the rails may be attached to the legs near the center thereof or adjacent the bottom thereof since the required spacing is inherent provided that all of the trays are constructed in the same manner.

The leg inserts 15 and 16 are adapted to fit tightly within the tubular legs 11 and have nesting means 25 and 26 which preferably have the multi-pyramidal surface configuration illustrated. Such a surface requires less height than a ball-and-socket or other nesting means and provides a slip-resistant attachment between trays even though all of the trays and legs in the stack may not be in perfect registration with one another and even though some of the trays in the stack may be conventional wooden trays. Furthermore, the nesting means 26 of the bottom tray in the stack provides an anti-slip multi-point contact with the floor.

The present trays are conventionally transported over roller conveyors which have a width less than the distance between the legs 11 in FIG. 2 so that the rollers engage the underside of bottom members 14 to convey the tray in a direction parallel to the direction of the bottom members 14. It is critical that the members 14 resist flexing and bowing under the load of the contents and under the stress of conveyance because otherwise the contents can shift within the tray causing disruption of the contents and jamming of the tray between conveyor rollers.

While the bottom members are resistant to flexing and bowing, the openings 19 in the base of the present trays permit excellent circulation of the ambient heat and air up through the base and through the compost and mushroom mycelium. Similarly, the extruded elements 12, 13 and 14 are much thinner than prior wooden slats and are much more heat-conductive than wooden slats so that they permit the contents of the trays to reach ambient conditions more quickly and more uniformly than wooden trays.

Variations and modifications may be made within the scope of the claims and portions of the improvements may be used without others.

We claim:

1. A tray for use in stacked relationship and adapted for the growth of mushrooms comprising:

four upright tubular aluminum legs defining the corners of a rectangle, two opposed aluminum side panels and two opposed aluminum end panels connected to corresponding areas of said legs to define a rectangular enclosure having the legs extending beyond said panels, each of said end panels having a bottom flange which extends inwardly of said container at a right angle to said panel a sufficient distance to provide connection means for bottom members adjacent the ends of said bottom members, a plurality of spaced angular aluminum bottom members, each of which is connected adjacent each end thereof to the bottom flange of said opposed end panels, to provide a rigid discontinuous support for the contents of said tray, the spacing between said angular bottom members providing a multiplicity of slots adapted to expose the base of the contents of the tray to ambient conditions, and nesting means seated in the top and bottom openings of said tubular legs and adapted to nest in slip-resistant relation with corresponding nesting means on the legs of other corresponding trays when said trays are used in stacked relationship.

2. A tray according to claim 1 in which each of said side panel and each of said end panel consist of upper and lower sections which fit together to form said side panel and said end panel.

3. A tray according to claim 1 in which said side panels and said end panels are connected to said legs adjacent the tops thereof, whereby said legs extend below the bottom members of the tray.

4. A tray according to claim 1 in which said nesting means comprise mating multi-pyramidal surfaces.

5. A tray according to claim 2 in which said upper sections comprise a flanged reinforcing upper edge portion and said lower sections comprise said bottom flange, the bottom flange of each of said opposed side panels extending inwardly of said container at a right angle to said panels to provide slots between said flanges and the bottom members adjacent thereto, and said sections fit together by interlocking means.

* * * * *

PO-1050
(5/69)

UNITED STATES PATENT OFFICE
CERTIFICATE OF CORRECTION

Patent No. 3,842,534　　　　　　　Dated October 22, 1974

Inventor(s) Armon J. Walters and Peter A. Banis

It is certified that error appears in the above-identified patent and that said Letters Patent are hereby corrected as shown below:

Column 1, line 54, "that" should read -- the --.

Column 2, line 51, "faricated" should read -- fabricated --; line 53, before "or", both occurrences, "rails" has been omitted; line 55, before "or", "rails" has been omitted.

Column 5, claim 2, lines 2 and 4, "panel" should read -- panels --.

Signed and sealed this 24th day of December 1974.

(SEAL)
Attest:

McCOY M. GIBSON JR.
Attesting Officer

C. MARSHALL DANN
Commissioner of Patents